Figure 1:
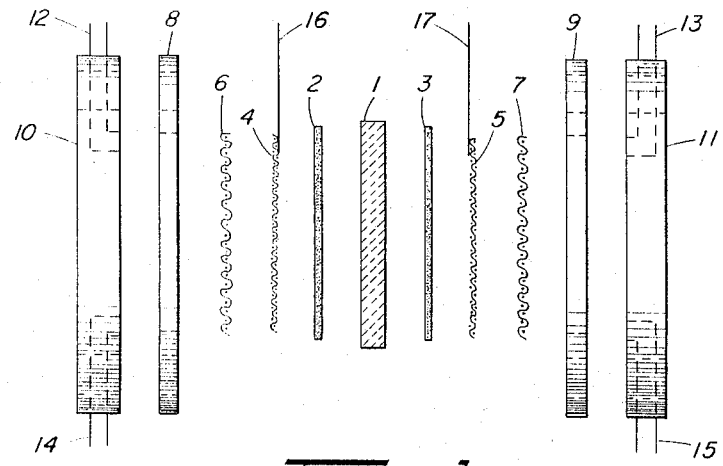

INVENTORS.
WILLIAM AUSTIN BARBER
ROBERT GEORGE HALDEMAN
BY
ATTORNEY

United States Patent Office 3,305,400
Patented Feb. 21, 1967

3,305,400
PREPARATION OF FUEL CELL ELECTRODES
William Austin Barber, Springdale, and Robert George Haldeman, Rowayton, Conn., assignors to American Cyanamid Company, Stamford, Conn., a corporation of Maine
Filed May 27, 1963, Ser. No. 283,441
5 Claims. (Cl. 136—120)

The present invention relates to an improved process for preparing catalytic electrodes suitable for use in fuel cells and especially suitable for use in hydrogen-oxygen containing gas fuel cells. More particularly, the invention relates to the preparation of molded or powdered carbon catalytic electrodes employing (a) various inorganic catalytic agents, and (b) a well-defined class of binders or water-proofing agents. Still more particularly, this invention is concerned with the preparation of molded carbon catalytic electrodes utilizing either a polyethylene latex emulsion or a polytetrafluoroethylene emulsion as the binder and water-proofing agent in admixture with carbon prior to catalyst addition or deposition.

In the past, electrodes suitable for use in fuel cells have been molded, for instance, from either platinum black or any suitable noble metal supported on carbon on a metal screen. Such electrodes are not universally employed because of rapid failure due to the flooding of the resultant electrode. To obviate the flooding phenomenon, it has been proposed to add binders or water-proofing agents, such as petroleum waxes or polytetrafluoroethylene, immediately prior to molding of the platinum black or noble metal supported on carbon. Nonetheless, efficiency of the so-prepared electrode has not been wholly satisfactory.

It is, therefore, a principal object of the present invention to provide an improved catalytic electrode which is substantially water-proofed. It is a further object to provide a catalytic, highly efficient electrode capable of being prepared in a simple, straightforward and economical manner. These and other objects will become apparent from a consideration of the following detailed description.

It has been surprisingly found that a method for preparing an electrode of good performance and enhanced water-proofed properties can be provided in a straight-forward manner. In brief, this is accomplished by incorporating initially a water-proofing latex emulsion into an electrically conductive filler and thereafter adding thereto or depositing thereon the catalyst metal. The mixture can be employed either as a powder for use in a powder fuel cell, or it can be molded, if desired. In either form, a water-proofed electrode material of enhanced performance is obtained when the sequence of steps as outlined above is followed.

Illustrative of the electrically conductive filler herein employed is non-graphitic carbon or carbon black. One such non-graphitic carbon is Nerofil D. Advantageously, other carbons derived from substantially any source can be employed. Usually, from about 40% to about 80%, and preferably from 55% to about 75% of the conductive filler, based on the weight of the electrode solids blend, can be employed.

As previously stated, it is necessary to employ initially a water-repellent composition in admixture with the aforementioned electrically conductive filler. Such combination reduces the possibility of flooding during cell operation. If a water-repellent composition is not included, the performance of the electrode is markedly reduced in a comparatively short period of time. Illustrative water-repellent compositions contemplated are either polyethylene latex- or polytetrafluoroethylene latex-emulsions. In general, from about 1% to about 40% by weight of the water-proofing material, based on the weight of the overall electrode solids, may be added to the conductive filler prior to deposition of or admixture with catalyst.

The catalyst, equal to from about 1% to 50%, based on the weight of the electrode solids, is usually a metal, such as platinum, palladium, ruthenium, silver or nickel. The metal can be deposited on previously water-proofed carbon by reducing the metal in the form of its acid or salt such as, for instance, the sodium borohydride reduction of chloroplatinic acid to platinum. The metal, further, can be added in a finely divided state to the water-proofed carbon.

In general, either the polyethylene or the polytetrafluoroethylene emulsion, for instance, can be formed by dispersing discrete particles of either polyethylene or polytetrafluoroethylene in distilled water containing either a non-ionic or anionic emulsifying agent such as, for example, ethoxylated octylphenol, ethoxylated nonylphenol, or an alkali metal salt of an alkylaryl sulfonic acid. Advantageously, any commercially available non-ionic or anionic emulsifying agent of the class defined can be employed to stabilize the dispersion. The amount of emulsified particles usually ranges from about 40% to about 60% of the overall latex or emulsion composition.

Resultant mixture containing the carbon filler, water-proofing agent and catalyst can be thoroughly blended or admixed. The mixture is next placed on a metal cloth backing and squeezed dry, whereby substantial amounts of water are removed. Although the metal cloth backing can be omitted, such is not a preferred practice because a structurally weaker electrode results.

The formed electrode is next washed, as for instance with either aqueous mineral acids including sulfuric acid or bases, to remove soluble additives, with aliphatic alcohols, such as ethyl alcohol or isopropanol, or equivalents thereof, to remove any occluded emulsifier which normally would impair the catalytic action of the formed electrode.

In order to clarify the invention utilizing the above-formed electrode, the accompanying drawing defines one embodiment of such utilization.

Figure 2:
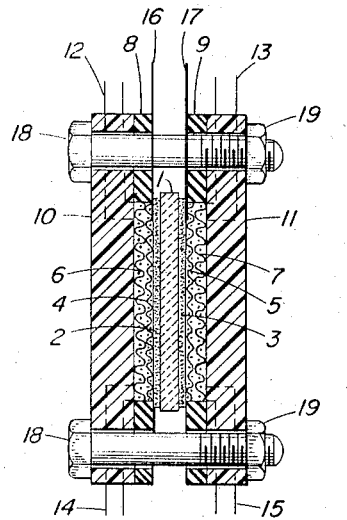

FIG. 1 of the drawing is an exploded plan view partially in section of a fuel cell employing the molded, water-proofed electrode of the present invention, and FIG. 2 is a partially expanded side view, partially in section of the fuel cell of FIG. 1.

In FIG. 1, a membrane 1, comprising filter paper saturated in electrolyte, usually 2 N to 8 N sulfuric acid, is positioned between electrodes 2 and 3 of the present invention. Abutting the latter electrodes are current collector screens 4 and 5 which comprise stainless steel or other suitable inert metal. Stainless steel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as silicone rubber. These seal as well as separate the chambers containing reactants. Exterior to the gaskets are housing members 10 and 11 having inlet stainless steel or other inert metal tubing 12 and 13 through which hydrogen and oxygen are separately introduced into the fuel cell. Stainless steel tubing 14 and 15 are provided as vents for unused gases. Wire leads 16 and 17 connected onto current collector screens 4 and 5 are the conductive members through which current flows from and to the fuel cell via the external circuit when the cell is in operation. The cell is secured by means of bolts 18 and nuts 19 as shown in FIG. 2.

The invention will be illustrated in conjunction with the following examples which are to be taken as illustrative only and not by way of limitation. All parts are by weight, unless otherwise noted.

*Example 1*

A pre-waterproofed catalyst powder containing 20% platinum is prepared in the following manner:

To 4.8 parts of non-graphitic carbon, Nerofil D, in 80 parts water is added 0.87 part of a 60% aqueous dispersion of polytetrafluoroethylene and the mixture agitated for fifteen minutes. To this mixture are added 3.17 parts of chloroplatinic acid. The latter is next reduced by dropwise addition of 35 parts of a 5% solution of sodium borohydride in water. Resulting suspension is heated to boiling, cooled, filtered, washed free of chloride and dried to give a highly hydrophobic black powder containing approximately 20% platinum on waterproofed carbon.

A paste of catalyst powder is prepared by mixing 0.35 part of the catalyst powder with 0.08 part of colloidal silica, Cab-O-Sil, and 0.4 part of water. Resultant paste is spread evenly on a 2" x 2" 84 mesh stainless steel screen. After suitable cleaning procedure to remove the colloidal silica and drying, the electrode is ready for use.

A one-inch diameter test electrode cut from the sheet is tested as an oxygen electrode in the cell described previously and gives at 0.7 volt, a current of 83 milliamperes per square centimeter and at 0.6 volt, a current of 170 milliamperes per square centimeter.

*Example 2*

A catalyst powder sample is prepared as in Example 1 but without addition of polytetrafluoroethylene waterproofing agent to give a powdered sample containing approximately 20% platinum on carbon.

This catalyst powder is mixed after platinum deposition with polytetrafluoroethylene latex, colloidal silica (Cab-O-Sil) and water to form a paste as in Example 1, which is made into an electrode sheet in the same manner. The electrode sheet contains the same quantities of each ingredient as that of Example 1, but differs only in the point at which the waterproofing agent is applied.

A one inch diameter test electrode cut from this sheet is tested as in Example 1 and gives at 0.7 volt a current of 30 milliamperes per square centimeter and at 0.6 volt, a current of 80 milliamperes per square centimeter.

It should be noted that this electrode prepared in the normal manner gives inferior results than when the waterproofing agent is added in the manner defined in Example 1, above.

*Example 3*

This example illustrates the effect in utilizing powdered electrodes in a typical powder fuel cell employing such electrodes as substantially described by E. Joachim and W. Vielstich, Electrochimica Acta 3, 244 (1960).

The procedures of Examples 1 and 2 above are repeated in every detail, except that electrodes are neither supported on stainless steel substrate nor molded. The performance results are tabularized below:

TABLE I

| Electrode Nerofil D Carbon 2.5 mg. Pt/cm.$^2$ | Current in ma./cm.$^2$* at— | | |
|---|---|---|---|
| | 0.50 | 0.45 | 0.40 Volt |
| No waterproofing | 115 | 135 | 160 |
| Pre-waterproofed | 123 | 154 | 180 |
| Post-waterproofed | 100 | 120 | 135 |

*Ma./cm.$^2$=Milliamperes per square centimeters.

It will be seen that where no water-proofing is employed, the performance of the cell is better than where the powder electrode is post-waterproofed. However, pre-waterproofing unexpectedly enhances the performance of the powder electrode.

We claim:

1. In the preparation of an electrode adapted for use in a fuel cell prepared by utilizing (a) an electrically conductive filler being present in an amount equal to between about 40% and 80%, (b) a catalyst equal to from about 1% to less than about 50%, and (c) a water-repellent composition equal to from about 1% to about 40%, said percentages being based upon the weight of the electrode solids mixture, the improvement which consists essentially in: initially adding the water-repellent composition to the electrically conductive filler, and thereafter depositing the catalyst onto said pre-waterproofed mixture.

2. The process according to claim 1, wherein the conductive filler is a non-graphitic carbon.

3. The process according to claim 1, wherein the catalyst is platinum.

4. The process according to claim 1, wherein the water-repellent composition is a dispersion of polyethylene.

5. The process according to claim 1, wherein the water-repellent composition is a dispersion of polytetrafluoroethylene.

References Cited by the Examiner

UNITED STATES PATENTS

| 3,013,098 | 12/1961 | Hunger et al. | 136—86 |
| 3,097,974 | 7/1963 | McEvoy et al. | 136—86 |
| 3,183,122 | 5/1965 | White et al. | 136—120 |

WINSTON A. DOUGLAS, *Primary Examiner.*

A. SKAPARS, *Examiner.*